US011405132B2

(12) United States Patent
Tiirola et al.

(10) Patent No.: US 11,405,132 B2
(45) Date of Patent: Aug. 2, 2022

(54) APPARATUSES AND METHODS FOR MANAGING BLIND SEARCHES

(71) Applicant: NOKIA TECHNOLOGIES OY, Espoo (FI)

(72) Inventors: Esa Tiirola, Kempele (FI); Karol Schober, Helsinki (FI); Volker Braun, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/245,439

(22) Filed: Jan. 11, 2019

(65) Prior Publication Data

US 2019/0215098 A1 Jul. 11, 2019

Related U.S. Application Data

(60) Provisional application No. 62/616,135, filed on Jan. 11, 2018.

(51) Int. Cl.
*H04L 1/00* (2006.01)
*H04L 25/02* (2006.01)
(Continued)

(52) U.S. Cl.
CPC .......... *H04L 1/0038* (2013.01); *H04L 5/0053* (2013.01); *H04L 25/0238* (2013.01); *H04W 24/08* (2013.01); *H04W 72/042* (2013.01); *H04W 72/0446* (2013.01); *H04L 5/0007* (2013.01)

(58) Field of Classification Search
CPC ... H04L 1/0038; H04L 5/0007; H04L 5/0053; H04L 25/0238; H04L 1/0072; H04W 24/08; H04W 72/042; H04W 72/0446
See application file for complete search history.

(56) References Cited

U.S. PATENT DOCUMENTS 10,271,321 B1 * 4/2019 Patel .................... H04L 1/0039
2016/0150391 A1 5/2016 Lee et al.
(Continued)

FOREIGN PATENT DOCUMENTS

JP 5734440 B2 6/2015
KR 10-2016-0033073 A 3/2016

OTHER PUBLICATIONS

Notice of Preliminary Rejection issued in corresponding Korean Patent Application No. 10-2020-7023007 dated Aug. 20, 2021, with English summary thereof.
(Continued)

*Primary Examiner* — Khoa Huynh
(74) *Attorney, Agent, or Firm* — Squire Patton Boggs (US) LLP

(57) ABSTRACT

Systems, methods, apparatuses, and computer program products for managing or monitoring of the control channel in new radio (NR) through blind searches are provided. One method may include determining whether a channel estimation limit has been reached for a user equipment. When it is determined that the channel estimation limit has been reached, the method may include selecting blind decoding candidate(s) to be dropped from different control resource set(s) or search space set(s), and removing the selected blind decoding candidate(s) from a set of monitored candidates.

21 Claims, 8 Drawing Sheets

(51) Int. Cl.

| | |
|---|---|
| ***H04W 72/04*** | (2009.01) |
| ***H04W 24/08*** | (2009.01) |
| ***H04L 5/00*** | (2006.01) |

(56) References Cited

U.S. PATENT DOCUMENTS

2019/0335425 A1* 10/2019 Seo ....................... H04L 1/0045
2020/0351896 A1* 11/2020 Taherzadeh Boroujeni ................ H04L 25/0202

OTHER PUBLICATIONS

Nokia, Nokia Shanghai Bell, "Remaining details on search space", 3GPP TSG RAN WG1 Meeting 91, R1-1720507, Nov. 17, 2017.
Samsung, "On Search Space Design", 3GPP TSG RAN WG1 Meeting 90bis, R1-1717642, Oct. 2, 2017.
Notification of Reasons for Rejection issued in corresponding Japanese Patent Application No. 2020-538654 dated Oct. 4, 2021, with English summary thereof.
First Examination Report issued in corresponding Indian Patent Application No. 202047034290, dated Nov. 23, 2021.
Communication pursuant to Article 94(3) EPC issued in corresponding European Patent Application No. 19 700 487.2, dated Jan. 25, 2022.
International Search Report and Written Opinion issued in corresponding PCT International Patent Application No. PCT/EP2019/050673, dated Apr. 17, 2019.
Decision of Final Rejection issued in corresponding Japanese Patent Application No. 2020-538654 dated Apr. 4, 2022 with English summary thereof.

* cited by examiner

| | | AL | | | | |
|---|---|---|---|---|---|---|
| | Y | 8 | 4 | 2 | 1 | # of BDs dropped |
| 1 | 15 | 1 | 1 | 1 | 1 | 4 |
| 2 | 15 | | 3 | 1 | 1 | 5 |
| 3 | 15 | | 2 | 3 | 1 | 6 |
| 4 | 15 | | 2 | 2 | 3 | 7 |
| 5 | 15 | | 2 | 1 | 5 | 8 |
| 6 | 15 | | 2 | 0 | 7 | 9 |
| 7 | 15 | | 1 | 5 | 1 | 7 |
| 8 | 15 | | 1 | 4 | 3 | 8 |
| 9 | 15 | | 1 | 3 | 5 | 9 |
| 10 | 15 | | 1 | 2 | 7 | 10 |
| 11 | 15 | | 1 | 1 | 9 | 11 |
| 12 | 15 | | 1 | 0 | 11 | 12 |
| 13 | 15 | | | 7 | 1 | 8 |
| 14 | 15 | | | 6 | 3 | 9 |
| 15 | 15 | | | 5 | 5 | 10 |
| 16 | 15 | | | 4 | 7 | 11 |
| 17 | 15 | | | 3 | 9 | 12 |
| 18 | 15 | | | 2 | 11 | 13 |
| 19 | 15 | | | 1 | 13 | 14 |
| 20 | 15 | | | | 15 | 15 |

Fig. 3

APPARATUSES AND METHODS FOR MANAGING BLIND SEARCHES

CROSS-REFERENCE TO RELATED APPLICATIONS

This application claims priority from U.S. provisional patent application No. 62/616,135 filed on Jan. 11, 2018. The contents of this earlier filed application are hereby incorporated by reference in their entirety.

FIELD

Some example embodiments may generally relate to mobile or wireless telecommunication systems. For instance, various example embodiments may relate to the monitoring of a control channel using blind searches.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment is directed to a method for managing blind searches, which may include determining, for example by a network node or UE, whether a CHE limit has been reached. In an embodiment, the determining may include determining whether the CHE limit has been reached by comparing the number of CCEs for which the CHE has to be performed in a slot with the number of CCEs that the UE is able to perform channel estimation for in a slot. When it is determined that the CHE limit has been reached, the method may include determining a number of CCEs to reduce. In certain embodiments, the method may also include splitting the number of CCEs to reduce into BD candidates of different ALs, and selecting BDs to be dropped from different CORESETs or search space set(s). In one embodiment, the method may then include removing or dropping the selected BDs.

Another embodiment is directed to an apparatus including at least one processor and at least one memory comprising computer program code. The at least one memory and computer program code may be configured, with the at least one processor, to cause the apparatus at least to determine whether a CHE limit has been reached. In an embodiment, the determining may include determine whether the CHE limit has been reached by comparing the number of CCEs for which the CHE has to be performed in a slot with the number of CCEs that a UE is able to perform channel estimation for in a slot. When it is determined that the CHE limit has been reached, the at least one memory and computer program code may be configured, with the at least one processor, to cause the apparatus at least to determine a number of CCEs to reduce. In certain embodiments, the at least one memory and computer program code may also be configured, with the at least one processor, to cause the apparatus at least to split the number of CCEs to reduce into BD candidates of different ALs, and select BDs to be dropped from different CORESETs or search space set(s). In one embodiment, the at least one memory and computer program code may be configured, with the at least one processor, to cause the apparatus at least to remove or drop the selected BDs.

Another embodiment is directed to an apparatus that may include determining means for determining whether a CHE limit has been reached. In an embodiment, the determining means may include means for determining whether the CHE limit has been reached by comparing the number of CCEs for which the CHE has to be performed in a slot with the number of CCEs that a UE is able to perform channel estimation for in a slot. When the determining means determines that the CHE limit has been reached, the apparatus may include means for determining a number of CCEs to reduce. In certain embodiments, the apparatus may also include means for splitting the number of CCEs to reduce into BD candidates of different ALs, and means for selecting BDs to be dropped from different CORESETs or search space set(s). In one embodiment, the apparatus may then include means for removing or dropping the selected BDs.

BRIEF DESCRIPTION OF THE DRAWINGS

For proper understanding of the invention, reference should be made to the accompanying drawings, wherein:

FIG. 3 illustrates an example of the BD candidate reduction for multiple candidates per Y, according to an embodiment;

DETAILED DESCRIPTION

Figure 1:
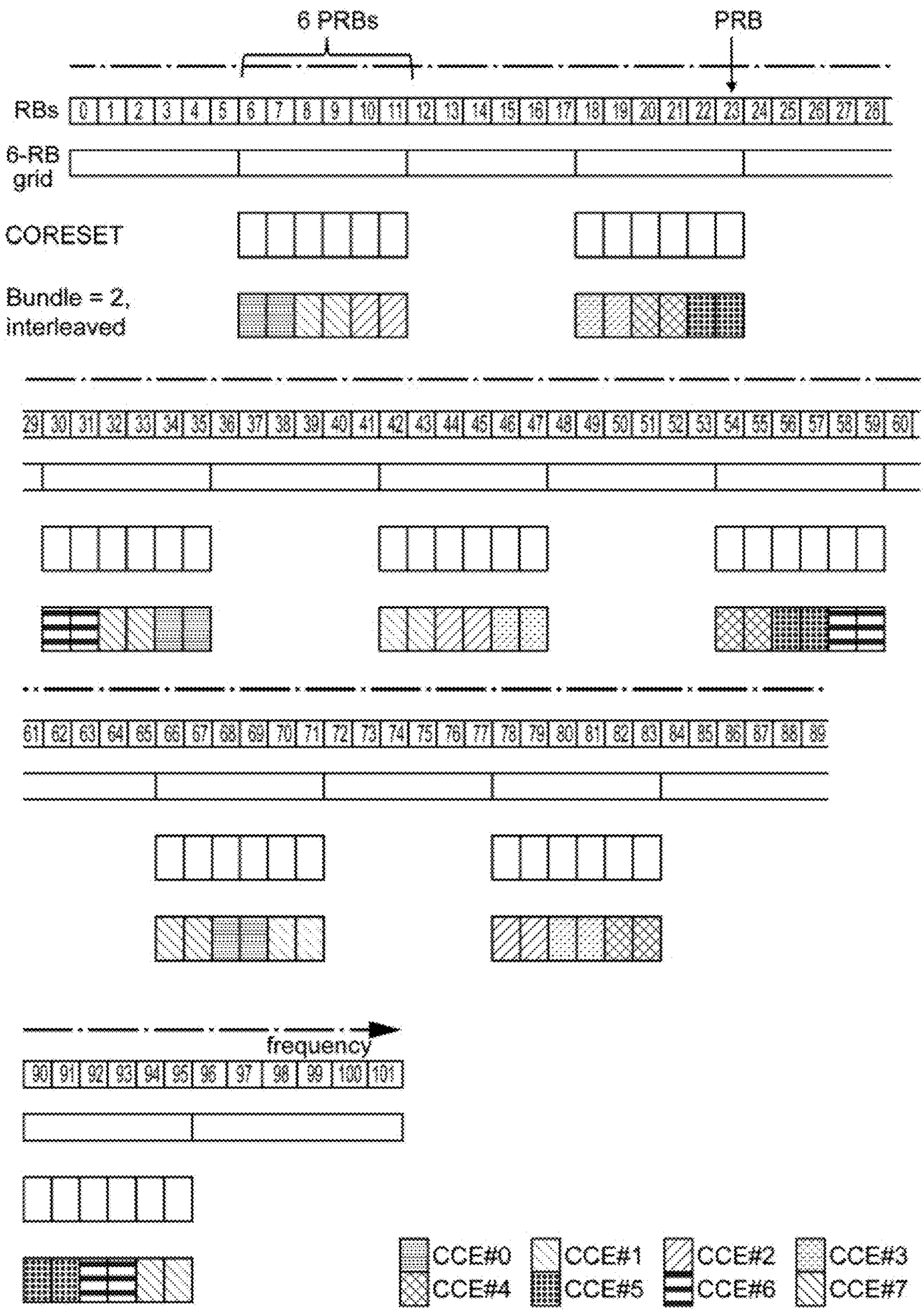
FIG. 1 illustrates an example of interleaved REG-to-CCE mapping, with REG bundle size=2 and 3-row interleaver, according to one example embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for managing or monitoring of the control channel in new radio (NR) through blind searches, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles, teachings and embodiments of this invention, and not in limitation thereof.

Certain embodiments may be directed to the monitoring of the control channel in NR that is carried out by blind searches. An objective, according to certain embodiments, may include providing a scalable solution for physical downlink control channel (PDCCH) monitoring with limited channel estimation capability of the user equipment (UE). It is expected that the channel estimation capability may be limited by all UEs that are operating according to NR specifications. This is due to the fact that NR supports up to three parallel control resource sets (CORESETs) with configurable size. On top of that, a UE can be configured with up to 10 parallel search space sets each having a predefined number of PDCCH candidates, configured for different aggregation levels for which it performs blind decodings (BDs). This may result in a very high channel estimation burden for the UE, especially when the CORESET size is large, and the gNB configures BDs with a high aggregation level (such as 16 and/or 8) for different search space sets. In certain embodiments, signaling means may be used to set to zero the number of candidates of certain aggregation levels to be monitored by the UE. In related embodiments, the UE may receive signaling referring to a certain aggregation level, which may be interpreted by the UE as a command to not monitor the aggregation levels lower than the indicated aggregation level and possibly including the indicated aggregation level. Such signaling may be higher layer signaling, may be carried within a DCI or within a MAC control element. An objective of such signaling is to reduce the average number of blind decodes performed by a UE depending on the position of the UE within a cell, i.e., depending on the quality of the propagation channel.

NR physical downlink control channel (PDCCH) may be used to convey downlink control information (DCI). It may utilize orthogonal frequency division multiplexing (OFDM) waveform and polar coding. NR PDCCH may utilize every fourth resource element for demodulation reference signal (DMRS). DCI can be used for downlink (DL) and uplink (UL) resource allocation signaling. It may be used also for other purposes, such as carrier aggregation and bandwidth part (BWP) (de)activation, frame structure indication (Group common PDCCH) and power control updates.

As introduced above, certain embodiments may be directed to the monitoring of the control channel in NR that may be carried out by blind searches. Blind search or blind decoding (BD) may refer to the process by which a UE finds its PDCCH by monitoring a set of PDCCH candidates in every monitoring occasion. A monitoring occasion can be once a slot, once per multiple slots or multiple times in a slot. In an embodiment, PDCCH blind search may be arranged by means of parallel search spaces or search space sets mapped to one or multiple control resource sets (CORESETs). During a PDCCH blind search, a UE may be monitoring predefined control channel elements (CCEs), aggregated CCEs and/or downlink control information (DCI) sizes in predefined time instants, corresponding to configured monitoring occasions.

CCEs may be arranged within a predefined CORESET configured via higher layer signalling Each CCE may include 6 REGs (e.g., REG containing 12 subcarriers within 1 OFDM symbol), and 1, 2 or 3 REG bundles. REG bundles may be mapped into the CORESET either using interleaved or non-interleaved mapping. The UE may assume that REG bundle defines the precoder granularity in frequency and time used by gNB when transmitting PDCCH. CORESET resources may be configured in units of 6 resource blocks in the frequency. FIG. 1 illustrates an example PDCCH mapping assuming 1 symbol CORESET, interleaved REG-to-CCE mapping and REG bundle size 2. Table 1 below lists the REG bundle sizes options in terms of REGs, supported by new radio (NR).

TABLE 1

| CORESET length (#symbols) | Non-interleaved mapping (REG bundle: frequency × time) | Interleaved mapping (REG bundle: frequency × time) |
|---|---|---|
| 1 | 6 (6 × 1) | 2 (2 × 1), 6 (6 × 1) |
| 2 | 6 (3 × 2) | 2 (1 × 2), 6 (3 × 2) |
| 3 | 6 (2 × 3) | 3 (1 × 3), 6 (2 × 3) |

It is noted that there may be a linkage/association between a search space set and a CORESET. In 3$^{rd}$ Generation Partnership Project (3GPP) Release 15 (Rel-15), the maximum number of CORESETs configurable for a bandwidth part (BWP) in a cell for a UE is 3, and the maximum number of search space sets configurable for a BWP in a cell for a UE is 10, respectively.

Certain agreements have been reached related to UEs capability for PDCCH BD and the number of BDs supported. For example, in a first case, PDCCH monitoring periodicity may be of 14 or more symbols, and there can be PDCCH monitoring on up to three OFDM symbols at the beginning of a slot (case 1-1) or there can be PDCCH monitoring on any span of up to 3 consecutive OFDM symbols of a slot once a slot (case 1-2). In that case, for a given UE, search space configurations are within the same span of 3 consecutive OFDM symbols in the slot. In a second case, PDCCH monitoring periodicity may be of less than 14 symbols (case 2). A motivation behind this option is to support non-slot based scheduling. It is noted that this includes the PDCCH monitoring of up to three OFDM symbols at the beginning of a slot.

Table 2 depicted below shows one example of the maximum number of PDCCH BDs allowed per slot. The numbers in bracket in Table 2 may be further adjusted but not increased, where X<=16, Y<=8.

TABLE 2

| Max no. of PDCCH | SCS | | | |
|---|---|---|---|---|
| BDs per slot | 15 kHz | 30 kHz | 60 kHz | 120 kHz |
| Case 1-1 | 44 | 36 | 22 | 20 |
| Case 1-2 | [44] | | | — |
| Case 2 | [44 + X] | [36 + Y] | [22 + Y] | [20] |

The PDCCH channel estimation complexity should also be considered. UE vendors want to limit the number of CCEs the UE needs to perform channel estimation, to reduce the decoding latency (or to have reasonable UE complexity for PDCCH monitoring with the constrained decoding latency). And, it is understood that the PDCCH channel estimation complexity is not negligible at least in some cases. Thus, solutions for resolving the channel estimation complexity issue together with the impact on PDCCH blocking probability are desired. One option may be to define the limits of the number of CCEs for PDCCH channel estimation, which refers to the union of the sets of CCEs for PDCCH candidates.

The configurability of NR PDCCH blind decoding may include at least aggregation level(s), DCI format sizes, number of decoding candidates per aggregation level, different monitoring periodicities, and the set of CCEs for each decoding candidate. Different services and corresponding search space sets may use different PDCCH monitoring periodicities. To manage different services in an optimal manner, it may be preferable to configure PDCCH monitoring in different search space sets independently from each other, for example with different number of PDCCH candidates, different aggregation levels and monitoring periodicities. The consequence of this is that the number of BDs configured and/or the number of CCEs for channel estimation (CHE) may vary from slot to slot, for example according the number of search space sets monitored in the slot and/or according to time-dependency of the hashing function as well as the number of BDs monitored for different aggregation levels. The hashing function typically alters the number of allocated CCEs because of time dependent overlap of configured PDCCH candidates, where in LTE the hashing functions depend on the subframe index (absolute timing reference), while in NR they may depend on an absolute or relative timing reference, such as a counter incremented per monitoring occasion, where in either case the counting may be limited via a modulo operator. It may be that NR will allow over-booking of the BDs for some time instances, because for majority of time instances the BDs would be below the maximum.

Thus, a problem that arises is how to manage UE BDs (and gNB PDCCH transmission) in the cases when UE channel estimation complexity is the limiting factor. One example scenario may be where there are one or multiple CORESETs configured for an UE, one or multiple search space sets (SSS) configured for an UE, the UE can support at most M PDCCH BDs per slot (where M may be, e.g., 36 when using 30 kHz SCS), and the UE can support channel estimation for at most Z CCEs/slot (where Z may be, e.g., 48 when using 30 kHz SCS).

A solution is needed for reducing the number of CCEs down to the allowed level, which applies to any scenario, such as a different number of CORESETs, different number of SSS, different CHE/BD capabilities (including different numerologies), different combinations of slot based and non-slot based scheduling, and/or different combinations of CA and BWP. An appropriate solution would address how to deal with a limited number of BDs that a UE is capable of performing and a limited number of CCEs for which a UE is capable of computing channel estimates. The difficulty of the problem may be increased by the fact that it likely will not be possible to have a RRC parameter for configuring the CCE dropping (in other words, the functionality should be predefined or operate in implicit manner) in NR Rel-15.

It is noted that, as discussed herein, the terms PDCCH candidate and blind decode (BD) may be used equivalently, where the latter may be considered from the UE side where the BD needs to be performed for the respective PDCCH candidate assigned by the hashing function.

An embodiment provides an approach for CCE dropping to reduce the UE's channel estimation burden (e.g., related to PDCCH monitoring). Some embodiments may be based on predefined rules and/or implicit signalling (i.e., does not require any additional RRC signalling). According to certain embodiments, it may be assumed that the UE is aware of the number of BDs supported per slot, that the UE is aware of the number of CCEs per slot supported by channel estimation, and that the UE is aware of the COREST/SSS configuration. Further, in some embodiments, a gNB may be allowed to overbook PDCCH monitoring (i.e., the configuration exceeds the BD/CHE capability of the UE instantaneously), and the UE (gNB) may manage the PDCCH monitoring (PDCCH transmission) dynamically, e.g., from slot to slot or from monitoring occasion to monitoring occasion (even though the reduction pattern is periodic in time).

Certain embodiments may utilize or refer to parameters labelled as "X," "Y" and "Z," where X represents the number of CCEs for which the channel estimation has to be performed in a slot, Z represents the number of CCEs the UE is able to perform channel estimation for in a slot, and Y represents a number of CCEs to reduce.

One embodiment is configured to determine whether or not the CHE limit is reached, i.e., whether X>Z. In an embodiment, when it is determined that X>Z, then Y (number of CCEs to reduce) may be determined, Y may be split into BD candidates of different aggregation levels (Y(n)), and the BDs to be dropped from different CORESET(s)/search space set(s) are selected. According to an embodiment, when it is determined that X≤Z (i.e., X is not greater than Z), then no CCE dropping is performed. In certain embodiments, with multiple CORESETs or search space sets being configured for the UE, Y may be split into Y=Y'+Y"+ . . . , where Y' is assigned to a first CORESET or search space set, Y" is assigned to a second CORESET or search space set, and so on. The splitting of Y into Y', Y", etc. can be predefined via specification, be configured via explicit signaling, or be derived implicitly. A simple method for implicit splitting may be the splitting relative to the number of allocated CCEs, where the number of allocated CCEs can be precisely computed or be approximated by assuming zero overlap between the PDCCH candidates of different aggregation levels.

In one embodiment, a UE (or gNB) may determine whether the CHE limit is reached separately for each slot when PDCCH monitoring involving one or more UE-specific search space sets is performed. In another embodiment, CCEs that are part of common search space set are never dropped (in other words, the CCE dropping procedure is done for CCEs outside the common search space and the corresponding CORESET). In yet another embodiment, if at least one CCE of a BD candidate is dropped, then all the CCEs of the same BD candidate become dropped (in other words, in one embodiment, partial dropping of a BD candidate may not necessarily be provided).

According to one embodiment, a UE may determine a combination of candidates reducing the number of CCEs, for which the channel estimation has to be performed, directly by means of the parameter Y and the set of aggregation levels configured. In an embodiment, if the candidates are non-overlapping with any other valid candidate, then channel estimation number may be reduced by Y (if all candidates are non-overlapping Y=Z−X). In another embodiment, if the candidates are (more or less) overlapping, then a second round of reduction may be performed. This can be avoided by defining that, if a certain CCE of a CORESET is dropped, this will impact all PDCCH candidates of search space sets of the same CORESET. In other words, if CCE(s) of a selected PDCCH candidate(s) are dropped, all valid candidates which overlap with the PDCCH candidate in at least one CCE are also dropped. In an embodiment, the UE (or gNB) may determine whether the CHE limit is reached after each CCE dropping occasion.

Figure 2:
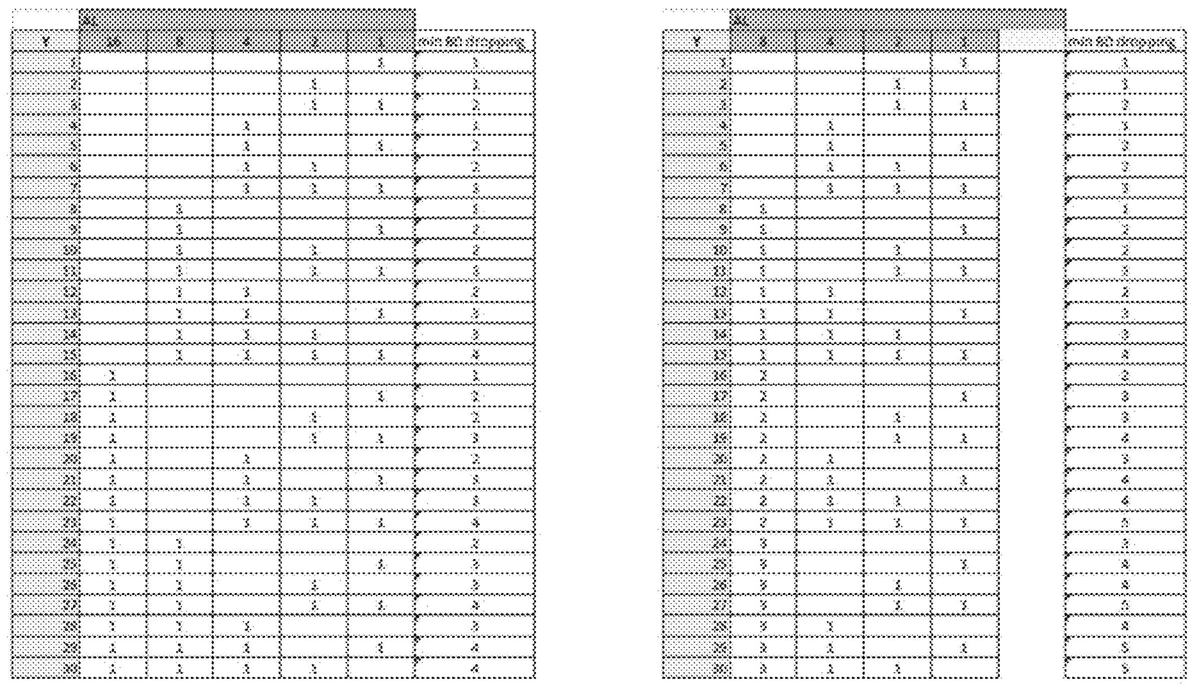
FIG. 2 illustrates an example of the BD candidate reduction for different aggregation levels, according to an embodiment.

According to certain embodiments, the splitting of Y (number of CCEs to reduce) into candidates of different aggregation levels may be determined according to aggregation levels supported by the UE (for example in the UE-specific search space sets). FIG. 2 illustrates an example of the BD candidate reduction for different aggregation levels assuming maximum aggregation level (AL) of 16 (left table) and 8 (right table). In some embodiments, if at least one CCE of a BD candidate is dropped, then all the CCEs of the same BD candidate become dropped. Thus, in an embodiment, the function Y(n) may be tabulated according to FIG. 2.

In another embodiment, the splitting of Y (number of CCEs to reduce) into candidates of different aggregation levels may be determined based on certain equation(s). For example, the following equations may be used to determine Y(n): For highest AL n=1, Y(1)=floor(Y/AL(1)); and for other ALs, Y(n)=mod(floor(Y/AL(n)),AL(n−1)/AL(n)), where AL is a vector indicating the PDCCH ALs (subject to CCE dropping) in descending order (e.g., AL=[8 4 2 1], and n is the AL index. If there are not enough CCEs to drop with certain AL(n), Y(n−1) may be incremented by 1. It is noted that the procedure for splitting Y into candidates of different ALs may also be applied in the case where CCE reduction is applied just for certain ALs, e.g., AL≤4. This may be used to ensure that PDCCH coverage can be maintained at sufficient level also in the case of CCE dropping.

Other embodiments provide different options for how to determine Y(n) if CCE dropping is not made according to the maximum aggregation levels. According to certain embodiments, there may be multiple ways to determine Y(n), when CCE dropping is not made according to maximum aggregation level. This approach may be used, for example, when CCE dropping does not result in sufficient BD reduction. For example, if Y=15, and at least 7 BDs are to be dropped, then combinations #4 or #7 shown in FIG. 3 could be feasible approaches.

It is possible that a need for CCE reduction may exist at the same time as a need for BD reduction. In this case, according to an embodiment, CCE reduction may be performed first before any BD reduction. If additional BD reduction is needed after performing the CCE reduction, then the BD reduction can be made after the CCE reduction procedure, as discussed above. In another embodiment, BD reduction may be performed first before CCE reduction. If additional CCE reduction is needed after performing BD reduction, then the CCE reduction may be performed.

In certain embodiments, when the combination is known, determining which candidates/BDs to drop may be done according to one or more predetermined dropping rules. In certain embodiments, the actual dropping rules may be based on labeling the candidates with a priority number. As an example, a priority number may be assigned to each of the BDs and/or candidates that are subject to potential BD reduction, and the number of BDs may be reduced according to the priority number. For instance, the BDs with the lowest priority numbers may be dropped until the desired level of BDs is reached. In some example embodiments, when multiple BDs have the same priority number, the BD with a lowest search space priority may be dropped.

According to other embodiments, the non-overlapping candidates may be dropped and then the over-lapping candidates may be dropped, as will be discussed in more detail below.

Figure 4:
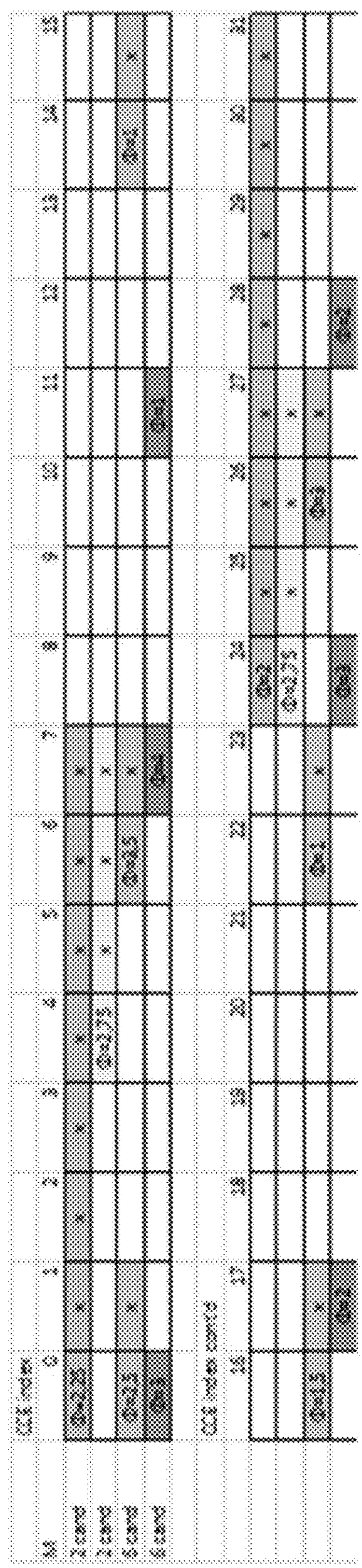
FIG. 4 illustrates an example of labelling the candidates with dependency on their overlap, according to an embodiment.

An example of a first alternative for the selection of BD candidates to be dropped from each AL is illustrated in connection with FIG. 4. More specifically, FIG. 4 illustrates an example of labelling the candidates with dependency on their overlap. In this first alternative, the candidates may be labeled by ϕ, which represents an average overlap of a candidate, the candidates determined by the candidate-combination may be dropped, and, within the AL, the candidate with the lowest ϕ may be dropped first. In the example of FIG. 4, the search-space has 32CCEs, and for example the AL8 starting at CCE index 0, has average overlap of ϕ=2.25, as the overlap for CCE 0-7 of the candidate is {3,2,1,1,2,2,3,4}. Thus, in this example, the first candidate to drop among AL8 candidates is the candidate starting at CCE index #24 since it has smaller average overlap of ϕ=2.

Figure 5:
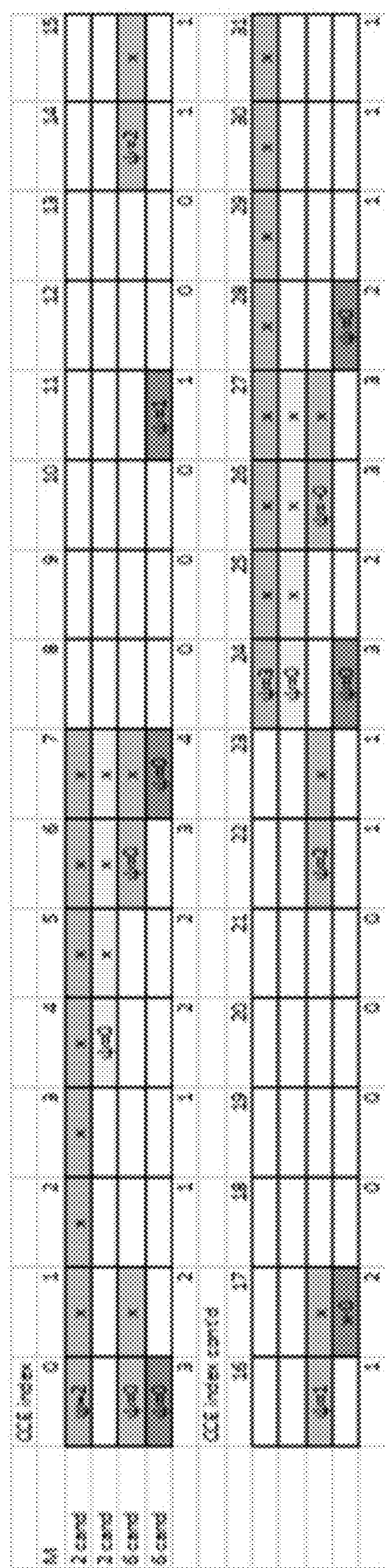
FIG. 5 illustrates another example of labelling the candidates with dependency on their overlap, according to an embodiment.

An example of a second alternative for the selection of BD candidates to be dropped from each AL is illustrated in connection with FIG. 5. More specifically, FIG. 5 illustrates another example of labelling the candidates with dependency on their overlap. In this second alternative, the candidates may be labeled by ψ, which denotes the number of CCEs that would be reduced if candidate is removed, the candidates determined by the candidate-combination may be dropped, and, within the AL, the candidate with the highest number ψ may be dropped first. In the example of FIG. 5, the search-space has 32CCEs, and for example the overlap-index of the AL8 candidate starting at CCE0 is ψ=2, because it has 2CCEs that are non-overlapping with any other candidate. Hence, in this example, the first candidate to drop among AL8 candidates is the candidate starting at CCE #0, since the other candidate at CCE #24 has higher overlap-index of ψ=3.

An example of a third alternative for the selection of BD candidates to be dropped from each AL may include, if there is a need for CCE dropping in a certain slot, making the selection based on BD dropping. For example, the BD dropping may be based on the predefined BD priority numbers. Priorities for the BD dropping may be defined as: The priority number is counted separately for each PDCCH candidate subject to BD dropping; The priority number depends on the PDCCH candidate index within the search space set s and aggregation level L. BD/PDCCH candidates can be indexed according to the hashing function or according to the lowest CCE of the BD candidate (1, 2, . . . ). The priority number, denoted as ρ_BD, may be defined as $$\rho_{BD}(s, L, m) = \frac{m}{M_s^{(L)}},$$

where s is the search space set index, L is the aggregation level index, M_Sˆ(L) is the number of PDCCH candidates, and m is the index of the PDCCH candidate, respectively. In the case when one or more CCE needs be dropped: at least one BD candidate from one or more search space sets is dropped which will reduce the number of CCEs to be estimated accordingly; BD candidates to be dropped may be defined according to the smallest ρ_BD (s, L, m) within all the involved search space sets subject to BD dropping; if multiple BDs have the same priority, dropping order may be defined according to the predefined priorities. For example, dropping order may be according to AL where, for instance, a BD candidate from a lower AL is dropped first. In other examples, the dropping order may be according to the search space set priority where, for instance, a BD candidate with a lower search space set priority is dropped first. In an embodiment, search space set priority may be derived implicitly for example from search space set IDs. In an embodiment, when there is a need to drop one or more CCEs due to the CCE cap/limit, the UE (and gNB) may drop BD candidates sequentially according to the priority number $\rho_{BD}$ (s,L,m), where dropping is continued until the number of CCEs/slot is within the predefined CCE cap. According to one embodiment, if CCEs of a selected candidate are dropped in certain CORESET, also other PDCCH candidates fully or partially overlapping with the CCE(s) are dropped in the CORESET in search-space-sets for which the dropping is applicable.

Therefore, all of the three alternatives discussed above, and illustrated in FIGS. 4 and 5, may take into account the actual overlap between candidates of different aggregation levels. In addition, according to certain embodiments, the three alternatives discussed above may be combined in any suitable manner.

In some example embodiments, the assignment of BDs may be carried out according to a priority metric or priority number, until the maximum number N of BDs per slot is reached. According to certain embodiments, this assignment strategy may be extended such that a BD is assigned according to the priority metric, unless the maximum number N of BDs per slot or the maximum number Z of CCEs per slot is exceeded. With this approach, there is no need for the determination of the actual number Y of CCEs to be dropped. It is also possible to have a rule where predefined BDs/CCEs (such as BDs/CCEs belonging to TYPE0, TYPE0A, TYPE1, TYPE2 and/or TYPE3 or other predefined common search space sets) are never dropped. When combined with a sequential dropping, the UE (and gNB) can just skip BD candidates belonging to CCEs/CORESETs of those search space sets, i.e., consider such a BD candidate as invalid for dropping and continue the sequential procedure with the next BD candidate. In some example embodiments, the dropping of BD candidates may be carried out sequentially according to a priority metric or priority number, until the number of CCEs to be channel estimated X is smaller or equal to the maximum number Z of CCEs allowed per slot. With this approach, there is no need for the determination of the actual number Y of CCEs to be dropped. To minimize the number of needed iterations, when the CCE(s) of a selected PDCCH candidate are dropped, all valid candidates which overlap with the PDCCH candidate in at least one CCE are also dropped. According to one embodiment, if CCEs of a selected candidate are dropped in certain CORESET, also other PDCCH candidates fully or partially overlapping with the CCE(s) are dropped in the CORESET in search-space-sets for which the dropping is applicable.

In some of the above example embodiments, PDCCH candidates of the highest aggregation level are often dropped first. However, according to other embodiments, the dropping strategy may alternatively start with the lowest aggregation levels. In an embodiment, the candidate assignment order (dropping order) may be given by a priority metric or number and, therefore, the assignment order (dropping order) may alter over the aggregation levels (e.g., assignment may be along aggregation levels 2, 1, 2, 1, 8, 4, 2, 1, . . . ). Further, in certain embodiments, the priority metric or number may be configured so as to treat all aggregation levels with equal priority, or to prefer either the higher or the lower aggregation levels, allowing for the implementation of various BD/CCE dropping strategies via configuration. In certain embodiments, there may be lean signaling means, such as a single signaling bit, for configuring whether to drop (or assign) the higher or lower aggregation levels first.

An alternative embodiment to limit the number of control channel elements assigned per slot, or both blind decodes and control channel elements assigned per slot, can be to assign the PDCCH candidates in two steps. In a first step, a first subset of PDCCH candidates may be assigned by using a first hashing function over the entire CORESET until the maximum number N of BDs per slot and/or the maximum number Z of CCEs per slot is reached. In a second step, the remaining PDCCH candidates may be assigned by a second hashing function over the subset of up to Z CCEs assigned in the first step.

In certain embodiments, the assignment of PDCCH candidates in the first step may be carried out by starting with the higher ALs and carrying on with the lower ALs, or vice versa. In alternative embodiments, the assignment of PDCCH candidates in the first step may be carried out according to the BD priority numbers. With either of these embodiments, the assignment of PDCCH candidates in the first step may include one or a plurality of ALs.

In certain embodiments, the assignment of PDCCH candidates in the first step may be stopped when the number of allocated CCEs per slot reaches Z for the first time. In alternative embodiments, the assignment of PDCCH candidates in the first step is not stopped when the number of allocated CCEs per slot reaches Z for the first time, and a PDCCH candidate is assigned if the number of allocated CCEs per slot does not exceed Z and if the number of allocated BDs per slot does not exceed N.

In certain embodiments, the second hashing function used for assigning PDCCH candidates in the second step may be substantially identical to the first hashing function used for assigning PDCCH candidates in the first step. In alternative embodiments, the second hashing function may be different from the first hashing function, e.g., the hashing function of either LTE PDCCH or LTE EPDCCH may be used in the second step, or a deterministic contiguous or non-contiguous assignment may be used in the second step, e.g., by using the hashing function of either LTE PDCCH or LTE EPDCCH, respectively, with random variables set to zero.

In certain embodiments, the subset of up to Z CCEs used for assignment of PDCCH candidates in the second step in a slot may be derived in the first step from the same search space set on the same CORESET. In alternative embodiments, the subset of up to Z CCEs used for assignment of PDCCH candidates in the second step in a slot may be derived from a plurality of search space sets on the same CORESET, possibly including one or a plurality of common search space sets and/or one or a plurality of other user-specific search space sets, including the same search space set. With the latter embodiment, the assignment of PDCCH candidates on a CORESET may start with a first search space set such as a common search space set, and may then continue with a second, third, . . . search space set such as user-specific search space sets, according to search space set priorities.

In the case of multiple CORESETs or search space sets assigned to a UE, the maximum number of N BDs and/or Z CCEs per slot may be split and assign values N', N", etc. and/or Z', Z", etc. to the respective CORESETs and/or search space sets, respectively. The splitting of N and Y may be predefined via specification, be configured via explicit signaling, or be derived implicitly, for example, the implicit splitting of N may be done according to BD priority numbers, and the implicit splitting of Z may be done relative to the number of allocated CCEs, where the number of allocated CCEs can be precisely computed or be approximated by assuming zero overlap between the PDCCH candidates of different aggregation levels.

Figure 6A:
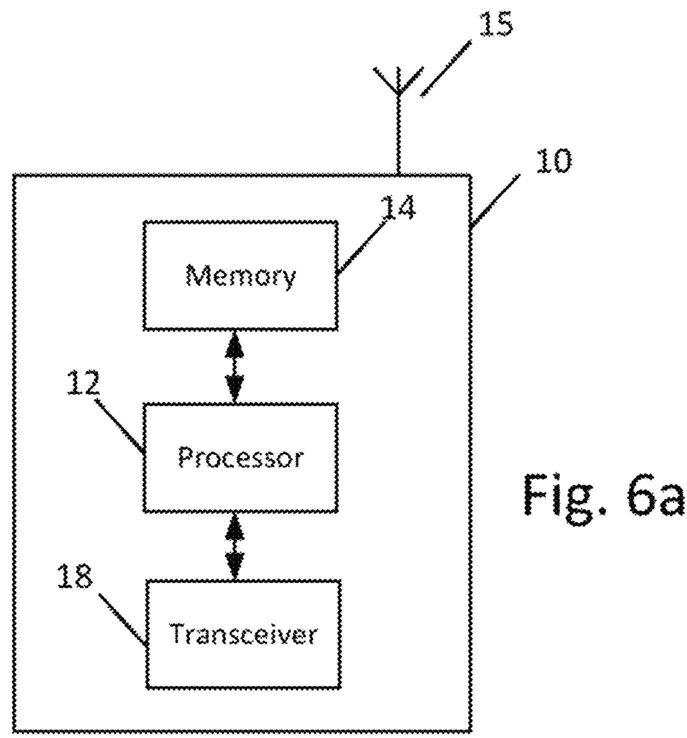
FIG. 6*a* illustrates a block diagram of an apparatus, according to one embodiment.

FIG. 6*a* illustrates an example of an apparatus 10 according to an embodiment. In an embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 6*a*.

As illustrated in the example of FIG. 6*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as the flow, signaling or block diagrams illustrated in FIGS. 1-5. In certain embodiments, apparatus 10 may be configured to perform monitoring of a control channel by blind searches that may include reducing or dropping CCE(s), for example, in order to reduce a UE's channel estimation burden.

For instance, in some embodiments, apparatus 10 may be controlled by memory 14 and processor 12 to determine whether a CHE limit has been reached. In an embodiment, it may be determined whether the CHE limit has been reached by comparing the number of CCEs for which the CHE has to be performed in a slot with the number of CCEs the UE is able to perform channel estimation for in a slot (i.e., whether X>Z). When it is determined that the CHE limit has been reached (i.e., when the number of CCEs for which the CHE has to be performed in a slot is greater than the number of CCEs the UE is able to perform channel estimation for in a slot), apparatus 10 may be controlled by memory 14 and processor 12 to determine a number of CCEs to reduce (Y), to split the number of CCEs to reduce into BD candidates of different ALs, to select BDs to be dropped from different CORESETs or search space set(s), and to remove or drop the selected BDs. According to certain embodiments, CCEs that are part of a common search space set are kept (i.e., not dropped).

When it is determined that the CHE limit has not been reached, apparatus 10 may be controlled by memory 14 and processor 12 to maintain the current CCE level (e.g., by not performing dropping of CCEs). In certain example embodiments, apparatus 10 may be controlled by memory 14 and processor 12 to determine whether the CHE limit has been reached separately for each slot when PDCCH monitoring involving one or more UE-specific search space sets is performed. In some embodiments, when at least one CCE of a BD candidate is dropped, apparatus 10 may be controlled by memory 14 and processor 12 to drop all of the CCEs of that BD candidate.

According to one embodiment, apparatus 10 may be controlled by memory 14 and processor 12 to determine a combination of BD candidates reducing the number of CCEs for which the CHE has to be performed directly from the number of CCEs to be reduced. For example, in an embodiment, if the BD candidates are non-overlapping with another valid candidate, apparatus 10 may be controlled by memory 14 and processor 12 to reduce the CHE number by the number of CCEs to be reduced. In another embodiment, if the BD candidates are substantially overlapping, apparatus 10 may be controlled by memory 14 and processor 12 to perform another round of CCE and/or BD reduction. According to an embodiment, apparatus 10 may also be controlled by memory 14 and processor 12 to drop non-overlapping BD candidates first, and then to drop overlapping BD candidates if necessary.

In some embodiments, apparatus 10 may be controlled by memory 14 and processor 12 to split the number of CCEs to be reduced into candidates of different ALs. For example, in an embodiment, the number of CCEs may be split according to the following equations: for highest AL, Y(1)=floor(Y/AL(1)); and for other ALs, Y(n)=mod(floor(Y/AL(n)),AL(n−1)/AL(n)), where AL is a vector indicating the PDCCH ALs (subject to CCE dropping) in descending order (e.g., AL=[8 4 2 1]), and n is the AL index. According to an embodiment, splitting the number of CCEs to be reduced into candidates of different ALs may include selecting BD candidates to be dropped from each AL based on which BD candidate has a lowest average group, for example as illustrated in the example of FIG. 4. In another embodiment, splitting the number of CCEs to be reduced into candidates of different ALs may include selecting BD candidates to be dropped from each AL based on which BD candidate has a highest number of CCEs that would be reduced if the BD candidate is removed.

In one embodiment, apparatus 10 may also be controlled by memory 14 and processor 12 to determine which of the CCEs and/or BD candidates to remove based on predefined search space set priorities and/or rules. For example, in one embodiment, when the maximum number of allowed BD attempts is reached, the BDs may be reduced according to a priority number assigned to each BD and according to the predefined search space set priorities and/or rules. In this embodiment, the predefined search space set priorities and/or rules may include assigning a priority number to each of the BD candidates, and reducing the number of blind decoding attempts according to the priority number. For instance, in an embodiment, the predefined search space set priorities and/or rules may be configured to drop the BD(s) with the lowest priority number(s) until the allowed or desired level is reached, i.e., until the number of BDs is below the predefined maximum threshold of allowed BD attempts. In other embodiments, however, the predefined search space set priorities and/or rules may include dropping BD(s) with the highest priority number(s) until the allowed or desired level is reached. If multiple BDs have the same priority number, then the BD with the lowest search-space set priority (from among the BDs with the same priority number) may be dropped.

According to certain embodiments, apparatus 10 may also be controlled by memory 14 and processor 12 to transmit physical downlink control channel(s) to a UE given the reduced set of CCEs and/or BD candidates. In some embodiments, when both CCE reduction and BD reduction are needed, apparatus 10 may be controlled by memory 14 and processor 12 to perform CCE reduction first and, if additional BD reduction is still needed after the performing of the CCE reduction, apparatus 10 may then be controlled by memory 14 and processor 12 to perform BD reduction.

Figure 6B:
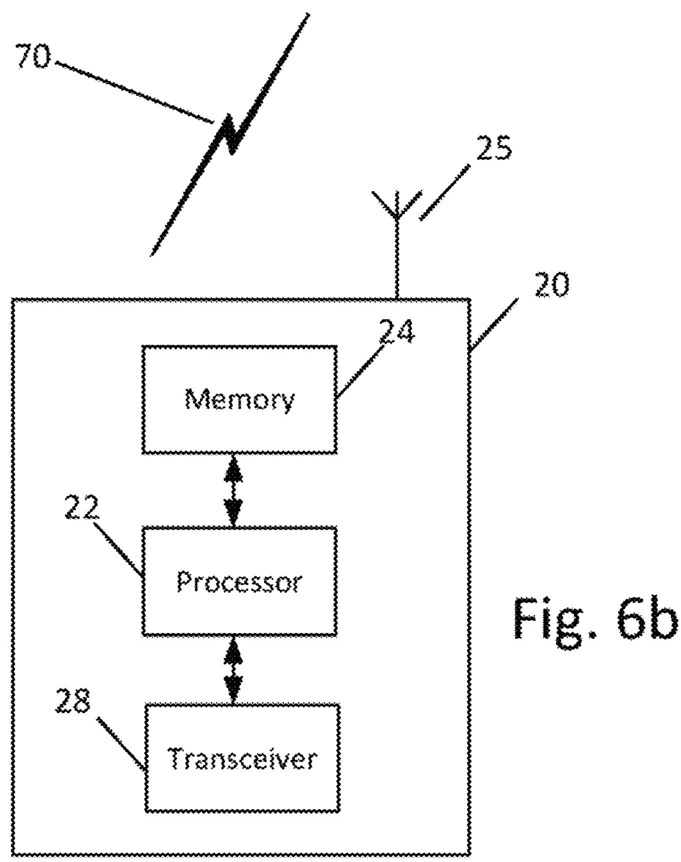
FIG. 6*b* illustrates a block diagram of an apparatus, according to another embodiment.

FIG. 6*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6*b*.

As illustrated in the example of FIG. 6*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 10 may include an input and/or output device (I/O device) or I/O circuitry. In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in any of the flow charts or signaling diagrams described herein, such as the flow, signaling or block diagrams illustrated in FIGS. 1-5.

For example, in certain embodiments, apparatus 20 may be controlled by memory 24 and processor 22 to perform NR control channel (e.g., PDCCH) BD attempts between multiple search spaces or sets of search space(s) or CORESETs. In an embodiment, as will be discussed in more detail below, when a CHE limit has been reached, apparatus 20 may be controlled by memory 24 and processor 22 to reduce the number of CCEs and/or BDs to be below the CHE limit.

For example, in one embodiment, apparatus 20 may be controlled by memory 24 and processor 22 to receive, from a network node, configuration of BDs and/or candidates on multiple search spaces, sets of search spaces and/or CORESETs that may result in the number of CCEs for which CHE has to be performed exceeds the number of CCEs that apparatus 20 is capable of performing CHE for in a slot. For instance, in some embodiments, apparatus 20 may be controlled by memory 24 and processor 22 to determine whether a CHE limit has been reached. In an embodiment, it may be determined whether the CHE limit has been reached by comparing the number of CCEs for which the CHE has to be performed in a slot with the number of CCEs the UE is able to perform channel estimation for in a slot (i.e., whether X>Z). When it is determined that the CHE limit has been reached (i.e., when the number of CCEs for which the CHE has to be performed in a slot is greater than the number of CCEs the UE is able to perform channel estimation for in a slot), apparatus 20 may be controlled by memory 24 and processor 22 to determine a number of CCEs to reduce (Y), to split the number of CCEs to reduce into BD candidates of different ALs, to select BDs to be dropped from different CORESETs or search space set(s), and to remove or drop the selected BDs. According to certain embodiments, CCEs that are part of a common search space set are kept (i.e., not dropped).

When it is determined that the CHE limit has not been reached, apparatus 20 may be controlled by memory 24 and processor 22 to maintain the current CCE level (e.g., by not performing dropping of CCEs). In certain example embodiments, apparatus 20 may be controlled by memory 24 and processor 22 to determine whether the CHE limit has been reached separately for each slot when PDCCH monitoring involving one or more UE-specific search space sets is performed. In some embodiments, when at least one CCE of a BD candidate is dropped, apparatus 20 may be controlled by memory 24 and processor 22 to drop all of the CCEs of that BD candidate.

According to one embodiment, apparatus 20 may be controlled by memory 24 and processor 22 to determine a combination of BD candidates reducing the number of CCEs for which the CHE has to be performed directly from the number of CCEs to be reduced. For example, in an embodiment, if the BD candidates are non-overlapping with another valid candidate, apparatus 20 may be controlled by memory 24 and processor 22 to reduce the CHE number by the number of CCEs to be reduced. In another embodiment, if the BD candidates are substantially overlapping, apparatus 20 may be controlled by memory 24 and processor 22 to perform another round of CCE and/or BD reduction. According to an embodiment, apparatus 20 may also be controlled by memory 24 and processor 22 to drop non-overlapping BD candidates first, and then to drop overlapping BD candidates if necessary.

In some embodiments, apparatus 20 may be controlled by memory 24 and processor 22 to split the number of CCEs to be reduced into candidates of different ALs. For example, in an embodiment, the number of CCEs may be split according to the following equations: for highest AL, Y(1)=floor(Y/AL(1)); and for other ALs, Y(n)=mod(floor(Y/AL(n)),AL(n−1)/AL(n)), where AL is a vector indicating the PDCCH ALs (subject to CCE dropping) in descending order (e.g., AL=[8 4 2 1]), and n is the AL index. According to an embodiment, splitting the number of CCEs to be reduced into candidates of different ALs may include selecting BD candidates to be dropped from each AL based on which BD candidate has a lowest average group, for example as illustrated in the example of FIG. 4. In another embodiment, splitting the number of CCEs to be reduced into candidates of different ALs may include selecting BD candidates to be dropped from each AL based on which BD candidate has a highest number of CCEs that would be reduced if the BD candidate is removed.

In one embodiment, apparatus 20 may also be controlled by memory 24 and processor 22 to determine which of the CCEs and/or BD candidates to remove based on predefined search space set priorities and/or rules. For example, in one embodiment, when the maximum number of allowed BD attempts is reached, the BDs may be reduced according to a priority number assigned to each BD and according to the predefined search space set priorities and/or rules. In this embodiment, the predefined search space set priorities and/or rules may include assigning a priority number to each of the BD candidates, and reducing the number of blind decoding attempts according to the priority number. For instance, in an embodiment, the predefined search space set priorities and/or rules may be configured to drop the BD(s) with the lowest priority number(s) until the allowed or desired level is reached, i.e., until the number of BDs is below the predefined maximum threshold of allowed BD attempts. In other embodiments, however, the predefined search space set priorities and/or rules may include dropping BD(s) with the highest priority number(s) until the allowed or desired level is reached. If multiple BDs have the same priority number, then the BD with the lowest search-space set priority (from among the BDs with the same priority number) may be dropped.

In some embodiments, when both CCE reduction and BD reduction are needed, apparatus 20 may be controlled by memory 24 and processor 22 to perform CCE reduction first and, if additional BD reduction is still needed after the performing of the CCE reduction, apparatus 20 may then be controlled by memory 24 and processor 22 to perform BD reduction.

Figure 7A:
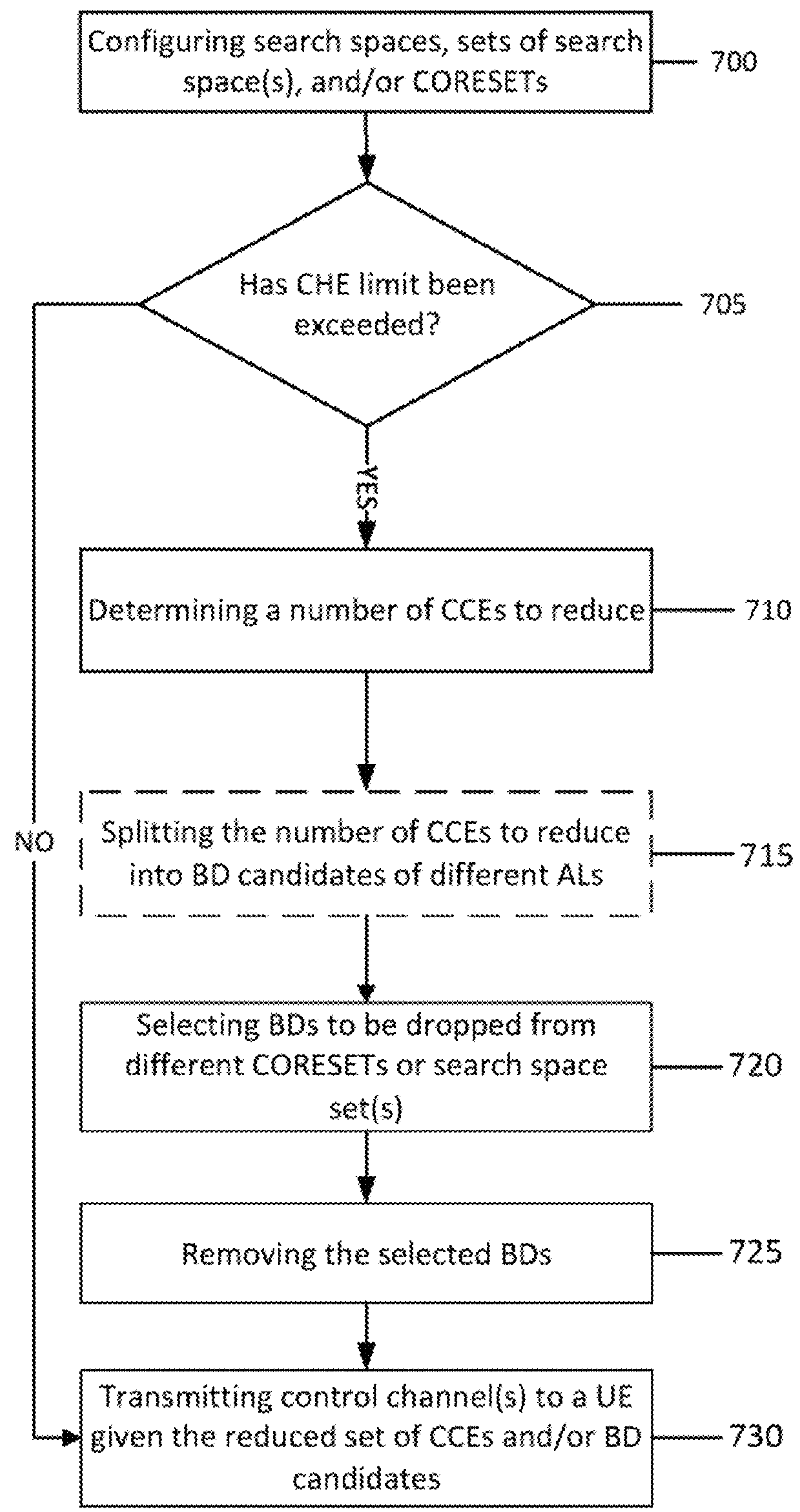
FIG. 7*a* illustrates an example flow diagram of a method, according to an embodiment.

FIG. **7*a* illustrates an example flow diagram of a method for controlling or managing NR control channel (e.g., PDCCH) blind searches, according to an example embodiment. In one embodiment, the method may be performed by a network node, such as a base station, eNB, gNB, relay node, or access node, for example. In an embodiment, the method of FIG. 7*a* may include, at 700, configuring multiple search spaces, sets of search space(s), and/or CORESETs, to a UE, which may result in a CHE capability of the UE being exceeded. The method may include, at 705, determining whether a CHE limit has been reached. This may be determined, for example, separately for each slot. In an embodiment, the determining 705** may include determining whether the CHE limit has been reached by comparing the number of CCEs for which the CHE has to be performed in a slot with the number of CCEs the UE is able to perform channel estimation for in a slot (i.e., whether X>Z).

When it is determined at 705 that the CHE limit has been exceeded (i.e., when the number of CCEs for which the CHE has to be performed in a slot is greater than the number of CCEs the UE is able to perform channel estimation for in a slot), the method may also include optionally, at 710, determining a number of CCEs to reduce (Y). In one optional embodiment, the method may also include splitting, at 715, the number of CCEs to reduce into BD candidates of different ALs. However, it is noted that the step 715 of splitting may be skipped in certain embodiments and the dropping may happen directly given the priority number. The method may also include selecting, at 720, BDs to be dropped from different CORESETs or search space set(s), and, at 725, removing or dropping the selected BD candidates. According to certain embodiments, CCEs that are part of one or more common search space set type(s) are kept (i.e., not dropped).

When it is determined that the CHE limit has not been reached, the method may include maintaining the current CCE level (e.g., by not performing dropping of CCEs) and returning to step 700. In certain example embodiments, the determining 705 may include determining whether the CHE limit has been reached separately for each slot when PDCCH monitoring involving one or more UE-specific search space sets is performed. In some embodiments, when at least one CCE of a BD candidate is dropped, the method may include dropping all of the CCEs of that BD candidate.

According to one embodiment, the method may also include determining a combination of BD candidates reducing the number of CCEs for which the CHE has to be performed directly from the number of CCEs to be reduced. For example, in an embodiment, if the BD candidates are non-overlapping with another valid candidate, the method may include reducing the CHE number by the number of CCEs to be reduced. In another embodiment, if the BD candidates are substantially overlapping, the method may include performing another round of CCE and/or BD reduction. According to an embodiment, the removing 725 may include dropping non-overlapping BD candidates first, and then dropping overlapping BD candidates if necessary.

In some embodiments, the splitting 715 may include splitting the number of CCEs to be reduced into candidates of different ALs. For example, in an embodiment, the number of CCEs may be split according to the following equations: for highest AL, Y(1)=floor(Y/AL(1)); and for other ALs, Y(n)=mod(floor(Y/AL(n)),AL(n−1)/AL(n)), where AL is a vector indicating the PDCCH ALs (subject to CCE dropping) in descending order (e.g., AL=[8 4 2 1]), and n is the AL index. According to an embodiment, splitting the number of CCEs to be reduced into candidates of different ALs may include selecting BD candidates to be dropped from each AL based on which BD candidate has a lowest average group, for example as illustrated in the example of FIG. 4. In another embodiment, splitting the number of CCEs to be reduced into candidates of different ALs may include selecting BD candidates to be dropped from each AL based on which BD candidate has a highest number of CCEs that would be reduced if the BD candidate is removed.

In one embodiment, the selecting 720 may include determining which of the CCEs and/or BD candidates to remove based on predefined search space set priorities and/or rules. For example, in one embodiment, when the maximum number of allowed BD attempts is exceeded, the BD candidates may be reduced according to a priority number assigned to each BD and according to the predefined search space set priorities and/or rules. In this embodiment, the predefined search space set priorities and/or rules may include assigning a priority number to each of the BD candidates, and reducing the number of blind decoding attempts according to the priority number or adding PDCCH candidates according to priority number until a limit is reached. For instance, in an embodiment, the predefined search space set priorities and/or rules may be configured to drop the BD(s) with the lowest priority number(s) until the allowed or desired level is reached, i.e., until the number of BDs is below or at the predefined maximum threshold of allowed BD attempts. In other embodiments, however, the predefined search space set priorities and/or rules may include dropping BD(s) with the highest priority number(s) until the allowed or desired level is reached. If multiple BDs have the same priority number, then the BD with the lowest search-space set priority (from among the BDs with the same priority number) may be dropped.

According to certain embodiments, the method may also include, at 730, transmitting physical downlink control channel(s) to a UE given the reduced set of CCEs and/or BD candidates. In some embodiments, when both CCE reduction and BD reduction are needed, the method may include performing CCE reduction first and, if additional BD reduction is still needed after the performing of the CCE reduction, the method may include performing BD reduction.

Figure 7B:
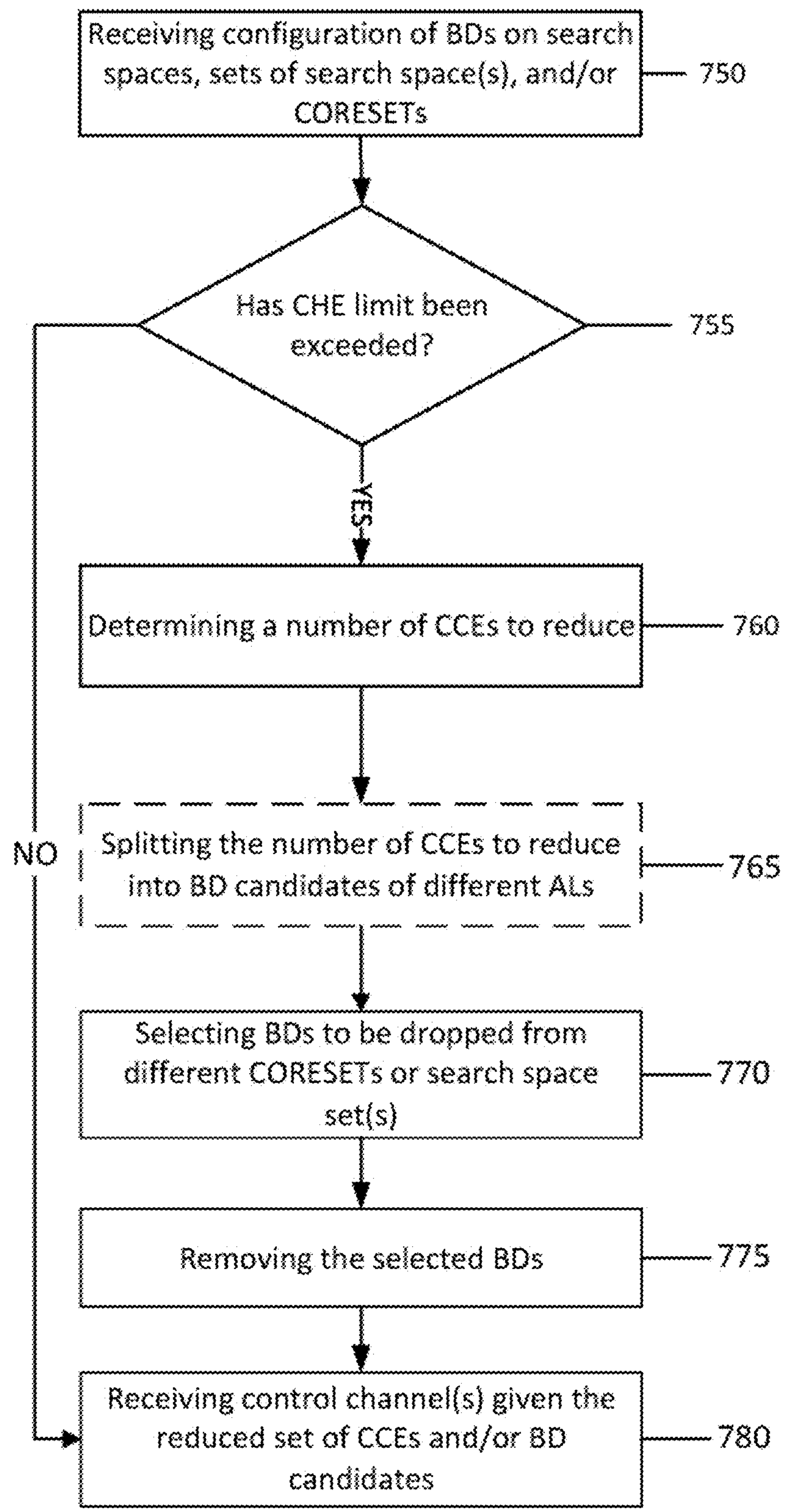
FIG. 7*b* illustrates an example flow diagram of a method, according to another embodiment.

FIG. 7*b* illustrates an example flow diagram of a method for performing NR control channel (e.g., PDCCH) blind searches, according to another embodiment. In one embodiment, the method of FIG. 7*b* may be performed by a UE or mobile station, for example. The method of FIG. 7*b* may include, at 750, receiving configuration of BDs or candidates on multiple search spaces, sets of search spaces or CORESETs, which may result in a CHE capability of the UE being exceeded. The method may include, at 755, determining whether a CHE limit has been reached. In an embodiment, the determining 755 may include determining whether the CHE limit has been reached by comparing the number of CCEs for which the CHE has to be performed in a slot with the number of CCEs the UE is able to perform channel estimation for in a slot (i.e., whether X>Z). When it is determined at 755 that the CHE limit has been reached (i.e., when the number of CCEs for which the CHE has to be performed in a slot is greater than the number of CCEs the UE is able to perform channel estimation for in a slot), the method may include, at 760, determining a number of CCEs to reduce (Y). The method may optionally include splitting, at 765, the number of CCEs to reduce into BD candidates of different ALs. However, according to certain embodiments, the splitting step 765 may be skipped. The method also includes selecting, at 770, BDs to be dropped from different CORESETs or search space set(s), and, at 775, removing or dropping the selected BDs. According to certain embodiments, CCEs that are part of a common search space set are kept (i.e., not dropped).

When it is determined that the CHE limit has not been reached, the method may include maintaining the current CCE level (e.g., by not performing dropping of CCEs) and returning to step 750. In certain example embodiments, the determining 755 may include determining whether the CHE limit has been reached separately for each slot when PDCCH monitoring involving one or more UE-specific search space sets is performed. In some embodiments, when at least one CCE of a BD candidate is dropped, the method may include dropping all of the CCEs of that BD candidate.

According to one embodiment, the selecting 770 may also include determining a combination of BD candidates reducing the number of CCEs for which the CHE has to be performed directly from the number of CCEs to be reduced. For example, in an embodiment, if the BD candidates are non-overlapping with another valid candidate, the method may include reducing the CHE number by the number of CCEs to be reduced. In another embodiment, if the BD candidates are substantially overlapping, the method may include performing another round of CCE and/or BD reduction. According to an embodiment, the removing 775 may include dropping non-overlapping BD candidates first, and then dropping overlapping BD candidates if necessary.

In some embodiments, the splitting 765 may include splitting the number of CCEs to be reduced into candidates of different ALs. For example, in an embodiment, the number of CCEs may be split according to the following equations: for highest AL, Y(1)=floor(Y/AL(1)); and for other ALs, Y(n)=mod(floor(Y/AL(n)),AL(n−1)/AL(n)), where AL is a vector indicating the PDCCH ALs (subject to CCE dropping) in descending order (e.g., AL=[8 4 2 1]), and n is the AL index. According to an embodiment, splitting the number of CCEs to be reduced into candidates of different ALs may include selecting BD candidates to be dropped from each AL based on which BD candidate has a lowest average group, for example as illustrated in the example of FIG. 4. In another embodiment, splitting the number of CCEs to be reduced into candidates of different ALs may include selecting BD candidates to be dropped from each AL based on which BD candidate has a highest number of CCEs that would be reduced if the BD candidate is removed.

In one embodiment, the method may include determining which of the CCEs and/or BD candidates to remove based on predefined search space set priorities and/or rules. For example, in one embodiment, when the maximum number of allowed BD attempts is reached, the BDs may be reduced according to a priority number assigned to each BD and according to the predefined search space set priorities and/or rules. In this embodiment, the predefined search space set priorities and/or rules may include assigning a priority number to each of the BD candidates, and reducing the number of blind decoding attempts according to the priority number. For instance, in an embodiment, the predefined search space set priorities and/or rules may be configured to drop the BD(s) with the lowest priority number(s) until the allowed or desired level is reached, i.e., until the number of BDs is below the predefined maximum threshold of allowed BD attempts. In other embodiments, however, the predefined search space set priorities and/or rules may include dropping BD(s) with the highest priority number(s) until the allowed or desired level is reached. If multiple BDs have the same priority number, then the BD with the lowest search-space set priority (from among the BDs with the same priority number) may be dropped.

In an embodiment, the method may also include, at 780, receiving control channel(s) given the reduced set of CCEs and/or BD candidates, from the network.

Therefore, embodiments of the invention provide several technical improvements, enhancements, and/or advantages. Various example embodiments provide a scalable solution for control channel monitoring with limited channel estimation capability of the UE. Some embodiments can facilitate an overbooking solution applicable to NR scenario, and are able to keep UE channel estimation complexity at a reasonable level. In addition, embodiments scale to any NR scenario, and may be implemented without RRC signaling (e.g., an approach that drops the highest aggregation level first while minimizing the number of dropped BDs does not require extra RRC signaling). Furthermore, computational complexity according to example embodiments is minimal. Accordingly, as a result of certain embodiments, network throughput and UE throughput performance may be enhanced. Furthermore, the PDCCH blocking can be reduced and UE can be configured with more BD candidates and/or CCEs. As such, embodiments of the invention can improve performance and throughput of networks and network nodes including, for example, access points, base stations/eNBs/gNBs, and mobile devices or UEs. Accordingly, the use of embodiments of the invention result in improved functioning of communications networks and their nodes.

In some embodiments, the functionality of any of the methods, processes, signaling diagrams, algorithms or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:

determining whether a channel estimation limit has been reached for a user equipment;

when it is determined that the channel estimation limit has been reached, selecting at least one blind decoding candidate to be dropped from different control resource sets or search space sets; and dropping the at least one selected blind decoding candidate from a set of candidates being monitored, wherein, when at least one control channel element of a blind decoding candidate is dropped, the method comprises dropping all of the control channel elements of that blind decoding candidate and all physical downlink control channel candidates of search space sets of a same control resource set.

2. The method according to claim 1, wherein the selecting of the at least one blind decoding candidate to be dropped from different control resource sets or search space sets is based on a predefined search space set priority.

3. The method according to claim 1, wherein the determining comprises determining whether the channel estimation limit has been reached by comparing the number of control channel elements for which the channel estimation has to be performed in a slot with the number of control channel elements that the user equipment is able to perform channel estimation in a slot.

4. The method according to claim 1, wherein control channel elements that are part of one or more common search space set types are always monitored.

5. The method according to claim 1, further comprising, when it is determined that the channel estimation limit has not been reached, the method comprises maintaining a current control channel element level.

6. The method according to claim 1, wherein the determining comprises determining whether the channel estimation limit has been reached separately for each slot when physical downlink control channel monitoring involving one or more UE-specific search space sets is performed.

7. The method according to claim 1, further comprising determining a combination of blind decoding candidates reducing the number of control channel elements for which the channel estimation has to be performed directly from the number of control channel elements to be reduced.

8. The method according to claim 1, wherein the selecting comprises determining which of at least one of the control channel elements or blind decoding candidates to drop based on predefined search space set priorities.

9. The method according to claim 8, wherein the predefined search space set priorities are determined based on a search space set ID.

10. The method according to claim 1, further comprising transmitting or receiving physical downlink control channels given at least one of the reduced set of control channel elements or blind decoding candidates.

11. An apparatus, comprising:

at least one processor; and at least one memory comprising computer program code, the at least one processor executes the computer program code to:

determine whether a channel estimation limit has been reached for a user equipment;

when it is determined that the channel estimation limit has been reached, select at least one blind decoding candidate to be dropped from different control resource sets or search space sets; and drop the at least one selected blind decoding candidate from a set of candidates being monitored, wherein, when at least one control channel element of a blind decoding candidate is dropped, the at least one processor executes the computer program code at least to drop all of the control channel elements of that blind decoding candidate and all physical downlink control channel candidates of search space sets of a same control resource set.

12. The apparatus according to claim 11, wherein the at least one processor executes the computer program code at least to select the at least one blind decoding candidate to be dropped from different control resource sets or search space sets based on a predefined search space set priority.

13. The apparatus according to claim 11, wherein the at least one processor executes the computer program code at least to determine whether the channel estimation limit has been reached by comparing the number of control channel elements for which the channel estimation has to be performed in a slot with the number of control channel elements that the user equipment is able to perform channel estimation in a slot.

14. The apparatus according to claim 11, wherein control channel elements that are part of one or more common search space set types are always monitored.

15. The apparatus according to claim 11, wherein, when it is determined that the channel estimation limit has not been reached, the at least one processor executes the computer program code at least to maintain a current control channel element level.

16. The apparatus according to claim 11, wherein the at least one processor executes the computer program code at least to determine whether the channel estimation limit has been reached separately for each slot when physical downlink control channel monitoring involving one or more UE-specific search space sets is performed.

17. The apparatus according to claim 11, wherein the at least one processor executes the computer program code at least to determine a combination of blind decoding candidates reducing the number of control channel elements for which the channel estimation has to be performed directly from the number of control channel elements to be reduced.

18. The apparatus according to claim 11, wherein the at least one processor executes the computer program code at least to determine which of at least one of the control channel elements or blind decoding candidates to drop based on predefined search space set priorities.

19. The apparatus according to claim 18, wherein the predefined search space set priorities are determined based on a search space set ID.

20. The apparatus according to claim 11, wherein the at least one processor executes the computer program code at least to transmit or receive physical downlink control channels given at least one of the reduced set of control channel elements or blind decoding candidates.

21. A non-transitory computer readable medium comprising program instructions stored thereon for performing at least the following:

determining whether a channel estimation limit has been reached for a user equipment;

when it is determined that the channel estimation limit has been reached, selecting at least one blind decoding candidate to be dropped from different control resource sets or search space sets; and dropping the at least one selected blind decoding candidate from a set of candidates being monitored, wherein, when at least one control channel element of a blind decoding candidate is dropped, dropping all of the control channel elements of that blind decoding candidate and all physical downlink control channel candidates of search space sets of a same control resource set.

* * * * *